UNITED STATES PATENT OFFICE.

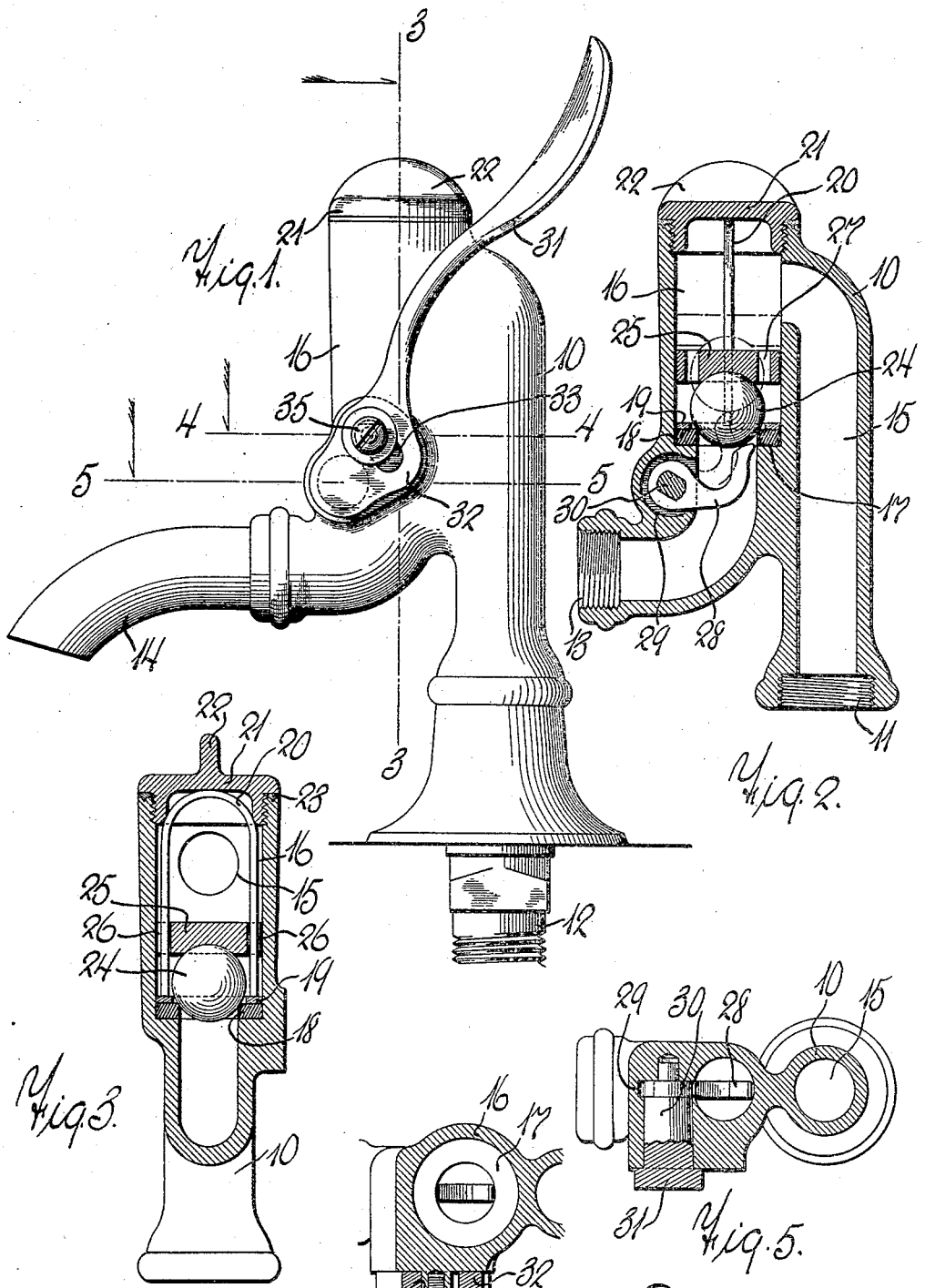

THERON DAVIS, OF NEW YORK, N. Y.

FAUCET.

931,732.  Specification of Letters Patent.  Patented Aug. 24, 1909.

Application filed June 23, 1908. Serial No. 439,928.

*To all whom it may concern:*

Be it known that I, THERON DAVIS, of the city, county, and State of New York, have invented a new and useful Improvement in Faucets, of which the following is a full, clear, and exact description.

My invention relates to improvements in faucets, and the object of my invention is to produce a self closing faucet which is particularly adapted for use as a water faucet, but can be used for drawing other liquids under pressure.

More particularly my invention is intended to provide a faucet which is simple in construction, which avoids the use of springs in its make-up, which has a ball valve adapted to be easily opened to permit water to pass, and which has a closing float actuated by water pressure, through which float the water can readily pass, but which serves under moderate pressure to instantly close the valve automatically if the handle of the faucet is freed.

Another object of my invention is to produce a faucet which, as stated, is inexpensive, positive in operation, and constructed so that all the parts are readily accessible and can easily be reached for renewal, repair or cleansing.

Reference is to be had to the accompanying drawings forming a part of this specification, in which similar reference characters indicate corresponding parts in all the views.

Figure 1 is a side elevation of the faucet embodying my invention. Fig. 2 is a vertical longitudinal section of the same. Fig. 3 is a cross section on the line 3—3 of Fig. 1, said section being at right angles to that shown in Fig. 2. Fig. 4 is a broken section on the line 4—4 of Fig. 1, and Fig. 5 is a cross section on the line 5—5 of Fig. 1.

The faucet has a casing 10 which can be made in any approved design and which has preferably a threaded base portion 11 to connect with an ordinary service pipe or coupling as at 12, while at the outlet end of the casing is another screw threaded portion 13 adapted to receive the delivery spout 14, but obviously the arrangement of the intake and outlet parts is subject to any change to meet different requirements. The casing has a bore 15 which is preferably, though not necessarily, vertical, and this discharges into a chamber 16, which for convenience is preferably cylindrical. The chamber 16 should be of uniform cross section preferably throughout, but necessarily between the inlet through the bore 15 and the valve seat 17. At the bottom of the chamber 16 is a valve seat 17, through the bore of which the water or other liquid passes. On this valve is a gasket 18 to permit the valve to be seated snugly thereon, as presently described, and the gasket is held in place by a narrower washer 19 which is securely attached to a bail 20 which is arranged vertically in the chamber 16, and should extend up into contact with the cap 21 of the chamber, although this is not essential. The cap 21 screws to the wall of the chamber 19, is provided with a boss 22 to enable it to be turned readily, and it preferably abuts with a gasket 23 which is inserted between a shoulder on the cap, and the top edge of the wall of the chamber 16. A ball valve 24 fits upon the gasket 18, and the valve also abuts with a float 25, preferably of metal, which rides on the valve and which should be concaved a little on the under side, as shown in Fig. 3, to fit the valve. The float 25 has openings 26 through which the bail 20 extends, and thus the float is guided on the bail. The float 25 has also numerous holes 27 therethrough for the passage of the water or other liquid. There are enough of these holes to permit the water to flow without apparent hindrance through the faucet, but still there is sufficient surface or area to the float for the water pressure to act thereon and quickly and automatically close the valve except when it is held open by manual means, as presently described.

It will be seen that by removing the cap 21 one can take hold of the bail 20 and lift all the mechanism of the valve out of the chamber 16 so that it can be cleansed, repaired or renewed, and by this means the gasket 18 can also be reached and a new one inserted when necessary. It will further be observed that the valve is always held automatically to place because the intake from the bore 15 is above the float 25, and thus the faucet is always positively closed.

The valve can be opened against the water pressure in any convenient way, but I prefer the mechanism shown, in which a finger 28 is arranged to swing upward from below the valve and lift it from its seat. The base of the finger turns in a recess 29 in the wall of the casing 10, and it fits a squared portion of the journal 30 (see Figs. 2 and 5), the latter turning in the casing, and having its outer end rigid on the handle or lever 31, which is further held in place and guided by the boss 34 and screw 35, the boss sliding in the slot 33 of the widened part 32 of the lever.

As shown in the drawing it will be observed that if the lever 31 is pulled forward, the finger 28 is swung into the position shown by dotted lines in Fig. 2, and the ball valve 24 and float 25 are lifted, while the liquid flows freely through the holes 27 and out through the spout 14. If, however, the lever is released, the water pressure on the float 25 quickly closes the valve.

It will of course be understood that the faucet can be made in any approved design, and that any suitable handle mechanism can be used for lifting the valve, without departing from the principle of the invention. It will also be understood that the weight of the handle 31 has a tendency to drop the finger 28 and permit the ball valve 24 and the float 25 to drop so as to close the valve even though there be no water pressure thereon.

Having thus fully described my invention, I claim as new and desire to secure by Letters Patent:—

1. A faucet having a chamber of uniform cross section with a valve seat therein, a ball valve fitting the said seat, a perforated float riding on the valve between the inlet of the faucet and the valve, and handle means serving to guide the float and connected operatively with the valve and float to remove them.

2. A faucet having a chamber of substantially uniform cross section therein, with a valve seat in the chamber, a ball valve fitting the said seat, a perforated float riding on the valve, a washer below the valve, and a handle device connected with the washer and extended upward through the chamber and contacting with the top wall thereof.

3. A faucet having a chamber of uniform cross section with a valve seat therein, a ball valve riding on the seat, a perforated float between the valve and the inlet of the faucet, and a bail or handle removable from the faucet and connected operatively with the valve and float to remove them.

4. A faucet having a chamber of uniform cross section, a ball valve therein, a washer below the valve, a perforated float above the valve fitting the chamber wall and lying between the valve and the inlet to the chamber, and a bail connected with the washer.

5. A faucet having a chamber of uniform cross section, a ball valve therein, handle mechanism for lifting the valve from its seat, a perforated float riding on the valve between the valve and the inlet to the faucet, and a device for collectively lifting the float and valve from the faucet.

THERON DAVIS.

Witnesses:
 CHARLES E. NYLANDER,
 WARREN B. HUTCHINSON.